United States Patent [19]

Condon

[11] Patent Number: 5,732,737
[45] Date of Patent: Mar. 31, 1998

[54] CONFORCE VALVE

[76] Inventor: David C. Condon, 12 Forcier Ct., Sussex, N.J. 07461

[21] Appl. No.: 741,310

[22] Filed: Oct. 30, 1996

[51] Int. Cl.[6] .......................... F16K 15/00; F16K 21/04; F16K 17/00
[52] U.S. Cl. ..................... 137/513; 137/522; 137/563
[58] Field of Search .......................... 137/513, 522, 137/523, 563, 595; 251/82, 83

[56] References Cited

U.S. PATENT DOCUMENTS

| | | | |
|---|---|---|---|
| 2,013,232 | 9/1935 | Bridenbaugh | 137/513 |
| 2,470,471 | 5/1949 | Carleton | 137/513 |
| 2,967,541 | 1/1961 | Norway et al. | 137/513 |
| 3,382,886 | 5/1968 | Hesselmann | 137/563 |
| 3,687,159 | 8/1972 | Schlor et al. | 137/563 |
| 4,790,289 | 12/1988 | Barrett | 137/563 |
| 5,390,809 | 2/1995 | Lin | 137/522 |
| 5,601,114 | 2/1997 | Hummel | 137/588 |

*Primary Examiner*—Denise L. Ferensic
*Assistant Examiner*—Joanne Y. Kim

[57] ABSTRACT

A pressure responsive check valve designed to quickly close in response to a drop in pressure below a pre-determined level. When used at the top of a fluid filled tank such as one used for heating oil, the valve prevents tank syphon by stopping fluid flow at the tank in the case of breakage of supply or return lines, The valve is contained in a pre-assembled unit for ease of installation.

1 Claim, 2 Drawing Sheets

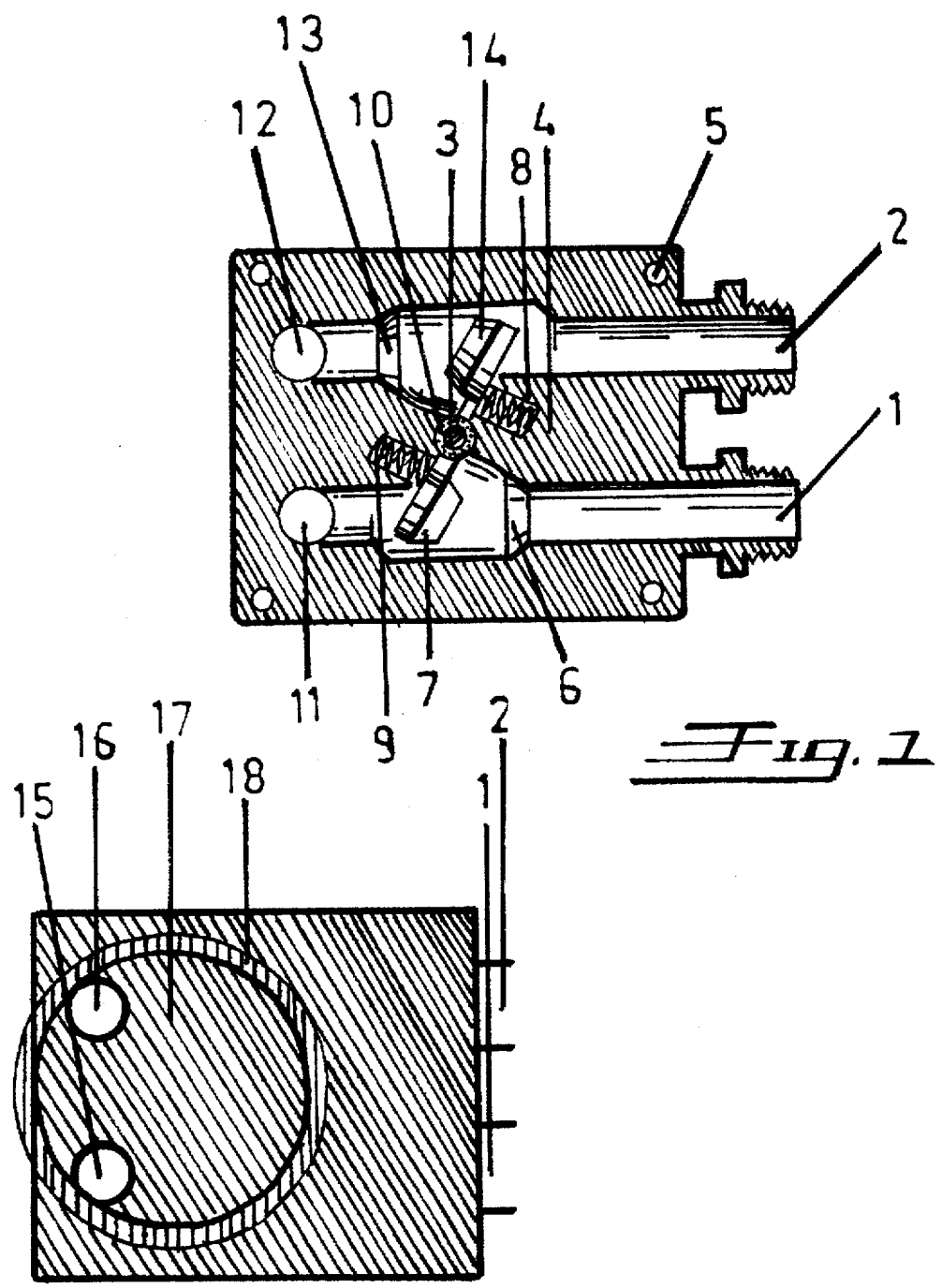

CONFORCE VALVE

BACKGROUND OF THE INVENTION

This invention relates to check valves in general which respond to pressure drops by automatically closing. In particular, the invention is used to prevent siphon of fluid filled tanks when pressure drops below a predetermined level. The valve is adapted to be positioned at the top of a fluid filled tank such as one which would supply oil for a heating system. At present, in line pressure sensitive check valves are used, however these do not provide complete end to end protection for supply and return lines in the case of breakage of either line. Breakage of either supply or return lines can cause the tank of fluid to siphon, potentially causing spillage of environmentally dangerous material. The invention automatically closes to protect both supply and return lines at the tank when pressure drops due to equipment malfunction or line breakage, thereby preventing the possibility of siphon. Although the concept of the present invention is particularly suited for use with fuel oil tanks, the valve is not limited to one particular application and may be used in any fluid filled tank where valve closure is required when system pressure drops in order to keep the fluid in the tank. The valve has a manual and an automatic position for initial start and/or service options.

SUMMARY OF THE INVENTION

The design of the invention is superior to present in-line check valves in that fluid is checked directly at the tank when pressure drops below a predetermined level. Once closed, the valve reopens upon resumption of correct system pressure. The invention possesses two spring-loaded cutoff valves, ganged together, with one valve aligned to the supply line and one to the return line. As the fuel pump runs, the pressure in the lines keeps the valve open against the spring pressure. When pressure drops below a predetermined level, the springs close the valve and stop the fluid flow at both supply and return. When the correct predetermined system pressure resumes the valve is again forced open allowing the fluid to flow. The valve mechanism is provided with a manual control switch to override the automatic feature for servicing of the system or of the valve itself. The above described valve is contained in a pre-assembled unit which connects to a female tank tapping at the top of the tank and contains tubing which extends into the tank to within 4 inches of the tank bottom, and 2 flair fittings attached to the valve body side. The pre-assembled unit eliminates several steps in the standard process of fluid filled tank installation.

OBJECTS OF THE INVENTION

It is therefore an object of this invention to provide a valve that is reliable and pressure responsive.

A further object of this invention is to provide a valve which senses drops in fluid pressure in lines, and stops flow quickly when pressure drops below a predetermined level.

A further object of this invention is to provide a valve which stops fluid flow directly at the tank at both lines to prevent siphon in case of breakage of either or both lines.

A still further object of this invention is to provide a valve which is contained in a pre-assembled unit for ease of installation.

Other objects and many of the attendant advantages will become apparent from a reading of the following detailed description and appended claims when considered with reference to the accompanying drawings.

BRIEF DESCRIPTION OF THE DRAWINGS

The following detailed description will provide a clear understanding of the invention when used in conjunction with the accompanying illustrations.

FIG. 1 is a cross-sectional view of the preferred embodiment of the pressure-responsive valve in an open and operational position.

FIG. 2 is a view of the valve body bottom showing supply and return openings for interior tank piping.

DETAILED DESCRIPTION OF THE PREFERRED EMBODIMENTS

Figure 3:
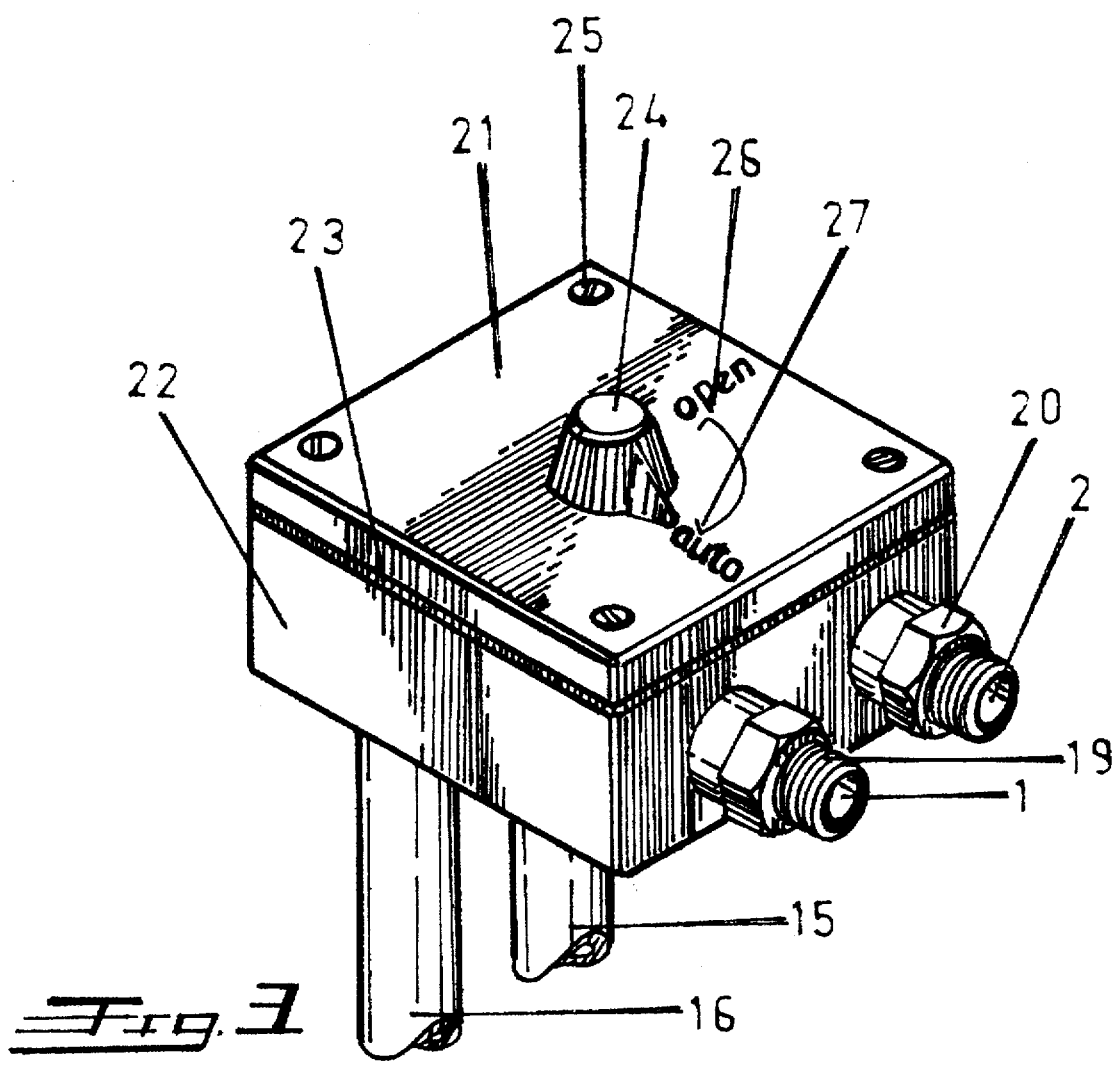
FIG. 3 is a view of the preferred embodiment of the entire unit assembly, showing manual override capability and pre-assembled features.

Referring to the drawings, wherein like reference characters designate like or corresponding parts, FIG. 1 shows a pressure responsive check valve comprising essentially a valve body 4, an oil supply port 2, an oil return port 1, a supply oil valve 14, a return oil valve 7, ganged together at a valve pivot point 3, contained in individual cylindrical chambers which lead to a supply oil drop line 12, and a return oil drop line 11, respectively. When the system pump is operating, as depicted by the arrows, liquid fuel passes through the oil return port 1, which forces open the return oil valve 7, allowing the liquid to pass through the valve to the return oil drop line 11, to the holding tank. Simultaneously, the supply oil valve 14 opens. Liquid is drawn up through the supply oil drop line 12 where it passes through the supply oil valve 14 and the supply oil port 2, to the system pump. When system pressure drops below a pre-determined level, the tension of the springs 8 which are each housed in individual bores 9, overcome system pressure and act to force the return oil valve 7 and the supply oil valve 14 into their respective seats. The return oil valve 7 closes securely in the return oil valve seat 6, and simultaneously the supply oil valve 14 closes securely in the supply oil valve seat 13 stopping fluid flow. A pivot seal 10 prevents oil from flowing from oil supply port 2 to oil return port 1. FIG. 2 shows the valve body underside 17, a threaded connector 18 which serves to attach the valve unit to the top of the fluid tank, and the openings at the valve underside where the return drop tubing 15 and the supply drop tubing 16 are attached by a welding method. FIG. 3 shows the entire unit embodiment containing the valve body 22, the removable access cover 21 with removable screws 25 which enables servicing and maintenance of the valve interior. The valve is equipped with a manual operating switch 24 which is utilized in the manual open position 26 for initial start of fluid flow. Once fluid flow is achieved the switch is manually turned to the automatic position 17, which allows the valve to operate automatically to perform its safety related functions. The pre-assembled unit contains a return side flare fitting 19 and a supply side flare fitting 20 which allow ease of connection to supply and return lines which carry fluid to and from the system pump. Return drop tubing 15 and supply drop tubing 16 is pre-assembled at the valve body, the length of which is pre-determined by the size of the fluid tank to which the valve will be attached.

Obviously, many modifications and changes in the above described embodiment of this invention can be carried out without departing from the scope thereof. The above description is intended to cover all alternatives, modifications, and equivalents as may be included within the spirit and scope of the invention as described by the appended claims.

What is claimed and desired to be secured by Letters Patent of the United States is:

1. A pressure responsive device in a pressurized fluid supply line and a pressurized fluid return line for stopping fluid flow upon sensing a drop in pressure below a predetermined level, comprising:

fluid valve means for opening and closing said fluid supply line and said fluid return line, said fluid valve means comprised of two spring loaded cutoff valves linearly joined together at a valve pivot point, one of said cutoff valves aligned to said fluid supply line and the other of said cutoff valves aligned to said fluid return line where said valves simultaneously move to open and closed positions;

control means to manually open said fluid valve means permitting fluid flow in said fluid supply line and said fluid return line;

a valve body having a tapping at the valve body base for mounting to a fluid source and having supply and return line fittings at a valve body side connected to said fluid supply line and said fluid return line, respectively, and supply drop tubing and return drop tubing at a valve body bottom.

* * * * *